(12) United States Patent
Tecu et al.

(10) Patent No.: US 12,485,801 B2
(45) Date of Patent: Dec. 2, 2025

(54) CAR SEAT SAFETY DEVICE

(71) Applicant: Bond Consulting Services, Inc., Mead, CO (US)

(72) Inventors: Kirk Steven Tecu, Longmont, CO (US); Duncan Doyle, Denver, CO (US); Sean Michael Shiers, Mead, CO (US)

(73) Assignee: Bond Consulting Services, Inc., Mead, CO (US)

( * ) Notice: Subject to any disclaimer, the term of this patent is extended or adjusted under 35 U.S.C. 154(b) by 56 days.

(21) Appl. No.: 18/342,050

(22) Filed: Jun. 27, 2023

(65) Prior Publication Data

US 2024/0001809 A1    Jan. 4, 2024

Related U.S. Application Data

(60) Provisional application No. 63/367,228, filed on Jun. 29, 2022.

(51) Int. Cl.
| | |
|---|---|
| *G08B 21/00* | (2006.01) |
| *B60N 2/00* | (2006.01) |
| *B60N 2/26* | (2006.01) |
| *G08B 21/02* | (2006.01) |

(52) U.S. Cl.
CPC ............ *B60N 2/0025* (2023.08); *B60N 2/26* (2013.01); *G08B 21/0205* (2013.01); *B60N 2230/20* (2023.08)

(58) Field of Classification Search
CPC .... B60N 2/0025; B60N 2/26; B60N 2230/20; B60N 2/28; B60N 2/2806; G08B 21/0205; G08B 21/22

USPC .......................................................... 340/667
See application file for complete search history.

(56) References Cited

U.S. PATENT DOCUMENTS

| | | | |
|---|---|---|---|
| 2005/0030188 A1* | 2/2005 | Flanagan | ................ B60R 99/00 340/457 |
| 2006/0167604 A1* | 7/2006 | Hibner | ............... G01G 19/4142 701/45 |
| 2012/0232749 A1* | 9/2012 | Schoenberg | ......... B60N 2/0022 340/457 |
| 2014/0085070 A1* | 3/2014 | Schoenberg | ........... B60N 2/268 340/457.1 |
| 2017/0129399 A1* | 5/2017 | Appukutty | ............. B60K 35/00 |
| 2020/0094709 A1* | 3/2020 | Dutkin | .................... B60R 99/00 |

(Continued)

*Primary Examiner* — Mark S Rushing
(74) *Attorney, Agent, or Firm* — Trenner Law Firm, LLC; Mark Trenner

(57) ABSTRACT

A car seat safety device is disclosed which may be implemented to help ensure a car seat is correctly installed in a vehicle and/or if a child is left unattended in the car seat in the vehicle. An example car seat safety device includes at least one sensor for placement on or near a vehicle seat for monitoring a safety condition of a child car seat. The example car seat safety device also includes a first wireless communications module communicatively coupled with output from the sensor. The example car seat safety device also includes a second wireless communications module interacting with the first wireless communications module. The second wireless communications module is communicatively coupled with a companion device to output an alert corresponding to the safety condition of the child car seat based on output of the at least one sensor.

17 Claims, 5 Drawing Sheets

(56) References Cited

U.S. PATENT DOCUMENTS

2020/0298782 A1* 9/2020 Zancanato ............... B60N 2/28
2022/0343750 A1* 10/2022 Wright ............... G08B 21/0236

* cited by examiner

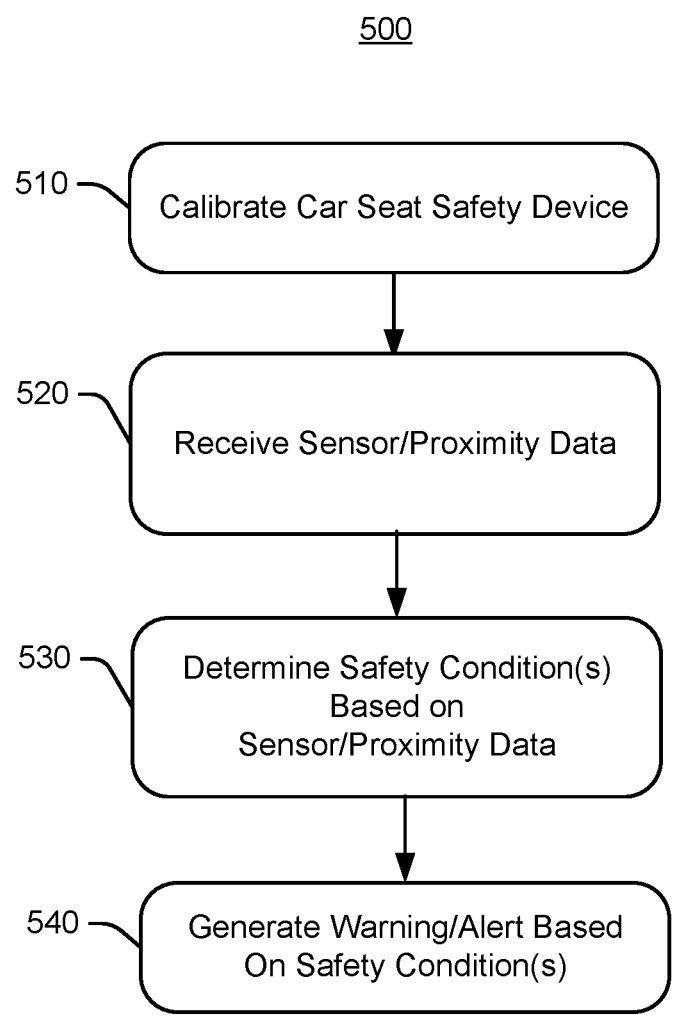

CAR SEAT SAFETY DEVICE

BACKGROUND

Infant restraint car seats (often simply referred to as "car seats") are required by law in all 50 U.S. states, although the specific age and/or weight limits vary from state to state. Car seats provide a safe and secure restraint system for infants and small children who might otherwise not be securely restrained in vehicle seats with seat belts made primarily for older children and adults.

Common safety considerations still need to be observed when using car seats. For example, the car seat must be securely fastened to the vehicle's seat belt system. It is not always easy to determine if the car seat is securely fastened. In addition, every summer there are tragic news reports of children that were forgotten and left buckled into their car seats in hot cars. The parent or guardian often does not realize they left the child in the car until it is too late.

BRIEF DESCRIPTION OF THE DRAWINGS

FIG. 5 is a flowchart illustrating example operations which may be implemented by the example car seat safety device.

DETAILED DESCRIPTION

Figure 1:
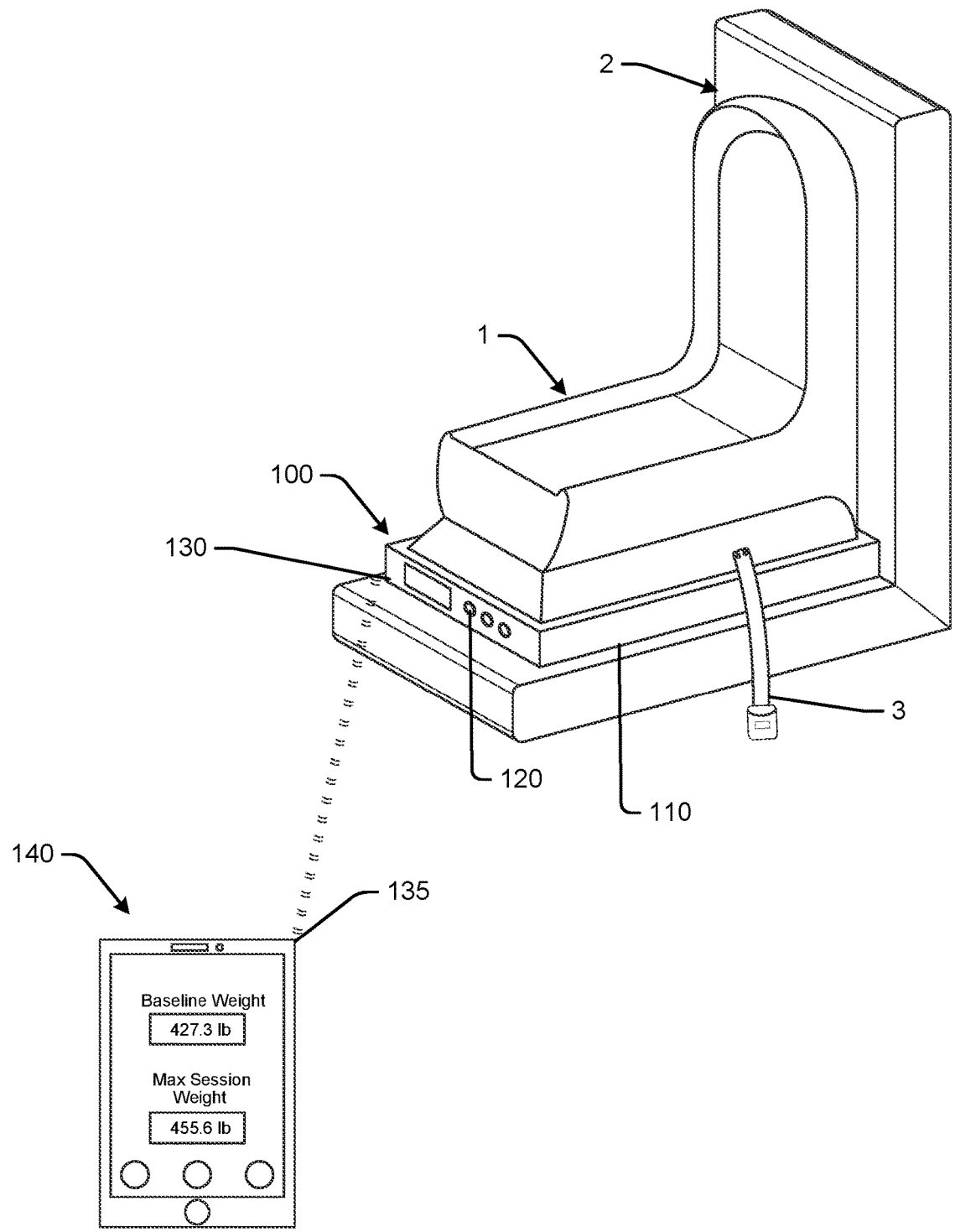
FIG. 1 illustrates an example car seat safety device as it may be implemented with a car seat.

A car seat safety device is disclosed which may aid the user to ensure that the car seat is securely fastened to the vehicle's seat belt system. In addition, the car seat safety device may help to remind the user that a child is in the car so that the child is not forgotten and left in a hot car.

An example car seat safety device implements an electronic weight scale pad that has wireless connectivity to the driver's mobile phone app or other end-user interface. The scale may be battery powered, making the device entirely wireless. The electronic scale may be placed on the vehicle's seat (e.g., the rear row seat). The child car seat is placed on top of the scale. The scale may have a surface that is the same or larger than the bottom of the car seat's hard base to ensure full contact. The seat belt may be fed through the car seat (or the car seat otherwise attached with a car seat attachment system) to secure the car seat to the vehicle seat.

A common issue for users is if they have tensioned the seat belt enough to properly secure the car seat. There is not a common quantitative method for determining what is "enough," and typically the user will just pull the belt until it feels snug. However, with the device disclosed herein, if the scale is turned on and transmits to a companion app to read the weight of the carseat, that weight can be equal to the car seat weight and the tension force down on the auto seat, and used to ensure that they meet a minimum total weight that has been predetermined (e.g., experimentally by the manufacturer). This may also be implemented by the app as a one-time or installation calibration step. Once secured, the weight measurement (baseline weight) will remain stable, and indeed can even be zeroed in the app.

After installation, as the user approaches the vehicle with an infant, the app may connect to the scale automatically (e.g., via a BLUETOOTH™ link or other wireless connection). The infant is buckled into the car seat, and a greater weight is measured and transmitted to the app. A new maximum weight is registered.

The driver may drive to their destination, and the app may remain connected to the scale (e.g., via a BLUETOOTH™ link or other wireless connection). When the user arrives and leaves the vehicle in the child car seat while accidentally walking away, the app loses connectivity with the scale. If the last reading detected by the scale is above the baseline weight and connectivity is lost, then the app may alert the user of a possible incident. If the child has been removed from the car seat and the user walks away, the weight returns to baseline and there is no need to alert the driver (i.e., the child has been removed from the child car seat).

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

FIG. 1 illustrates an example car seat safety device 100 as it may be implemented with a child car seat 1. The child car seat 1 is shown as it may be positioned on a seat 2 in a vehicle (not shown). The child car seat 1 may be buckled to the seat 2 in the vehicle with a seatbelt or strap 3. An example car seat safety device 100 may include a platform 110 that is positioned adjacent (e.g., beneath) the child car seat 1. The car seat safety device 100 is shown in FIG. 1 positioned between the seat 2 of the vehicle and the car seat 1. The platform 110 may be larger than the base of the child car seat 1.

The example car seat safety device 100 includes at least one sensor 120. The sensor 120 may be a part of the platform 110 for placement on or near the vehicle seat 2 for monitoring a safety condition of the child car seat 1.

In an example, the car seat safety device 100 includes a first wireless communications module 130 communicatively coupled with output from the sensor(s) 120. The example car seat safety device 100 also includes a second wireless communications module 135 interacting with the first wireless communications module 130. The second wireless communications is communicatively coupled with a companion device 140 of the car seat safety device 100. The companion device 140 is configured to output information (e.g., an alert) based on output from the sensor(s) 120 regarding a safety condition of the child car seat 1.

The companion device 140 may be implemented as electronics and/or program code for receiving input from one or more sensor devices 120 and executing instructions of the operations described herein. In an example, the companion device 140 may be a mobile device application or "app" executing on a mobile device such as a mobile phone, tablet, etc. Other implementations of the companion device 140 are also contemplated. For example, the companion device 140 may be a dedicated device, a device in the vehicle (vehicle head unit), or a remote device, to name only a few such examples.

In an example, the companion device 140 automatically connects with the first wireless communications module 130 when the companion device 140 (e.g., a mobile device) is within a predetermined proximity of the car seat safety device 100. The companion device 140 remains connected with the first wireless communications module 130 until the companion device 140 leaves the predetermined proximity. The companion device 140 automatically disconnects from the first wireless communications module 130 when the companion device 140 leaves the predetermined proximity of the car seat safety device 100. This proximity data provides information concerning the presence of the parent or guardian relative to the child car seat 1. The proximity data may be implemented in combination with data from one or more of the sensor(s) 120 to determine whether a child has been left in the child car seat 1 when the parent or guardian has stepped away from the vehicle.

In an example, the sensor 120 is a weight sensor. The weight sensor 120 measures a baseline weight indicating that the child car seat 1 is installed properly on the vehicle seat 2. The baseline weight is predetermined based on a calibrated weight of the child car seat 1 and a tension force of the child car seat 1 against the vehicle seat 2. This weight data may indicate proper installation of the child car seat.

The weight data may also indicate whether a child is still in the child car seat 1, and in combination with the proximity data, determine whether the child has been left behind in the vehicle by the parent or guardian, and thus help alert the parent or guardian to this situation. By way of example, the companion device 140 may register a new weight above the baseline weight indicating that a child is in the child car seat. A combination of registering the new weight and losing connectivity to the sensor and/or proximity data (e.g., the companion device leaving a proximity perimeter of the child car seat) indicates that the parent or guardian has left the vehicle, and may be a condition to activate an alarm on the companion device 140 (e.g., on the parent or guardian's mobile phone) alerting the user that the child has been left unattended in the vehicle.

In an example, the car seat safety device 100 may include other sensors 120 for providing information regarding the child car seat 1 to the companion device 140. By way of non-limiting illustration, the car seat safety device 100 may include a motion sensor to detect vehicle motion, a temperature sensor to detect temperature in the vehicle, a Global Positioning System (GPS), and/or any other sensor or other input device for providing information regarding the child car seat and/or the occupant of the child car seat to the user.

This information from the sensors 120 may be utilized alone or in combination with the other data (e.g., the weight data and/or proximity data) to generate alerts as to a safety condition. For example, an alert may only be generated if a child is detected in the child car seat 1, and the parent/guardian has left a predetermined proximity of the child car seat 1, and the temperature in the vehicle is unsafe. For example, an alarm may be activated when the child has been left unattended in the vehicle, but only when a temperature measured by the temperature sensor is outside of a range of threshold temperatures (too cold or too hot). These and/or other conditional rules may also be programmed to the companion device 140.

As another example, the sensor 120 may be an interlock sensor. Example interlock sensors include but are not limited to magnetic sensors such as those provided on windows in a home security system. The sensor may be attached to each side of the car seat buckle to detect when a child is buckled into the child car seat 1. The state of the sensor 120 may be communicated to the base unit 110 (wired or wireless). If a new weight is detected (e.g., the child is in the child car seat), and the state of the buckle based on the sensor is unbuckled, then an alert (a sound and/or visual alert) could be generated locally and/or via a mobile app. The interlock sensor may be utilized instead of the weight sensor, or in addition to the weight sensor.

The companion app may generate any suitable output. For example, in addition to notifying the user that the child car seat 1 is properly installed and/or that the child is still in the vehicle, the companion device 140 may also generate a reminder for the user to check that the child is buckled into the child car seat 1.

The operations described herein may be implemented with any suitable computing device(s). Each of the computing devices may include memory, storage, and a degree of data processing capability at least sufficient to manage a communications connection either directly with one another or indirectly (e.g., via a wireless communications network). At least one of the computing devices is also configured with sufficient processing capability to execute the program code described herein.

Figure 2:
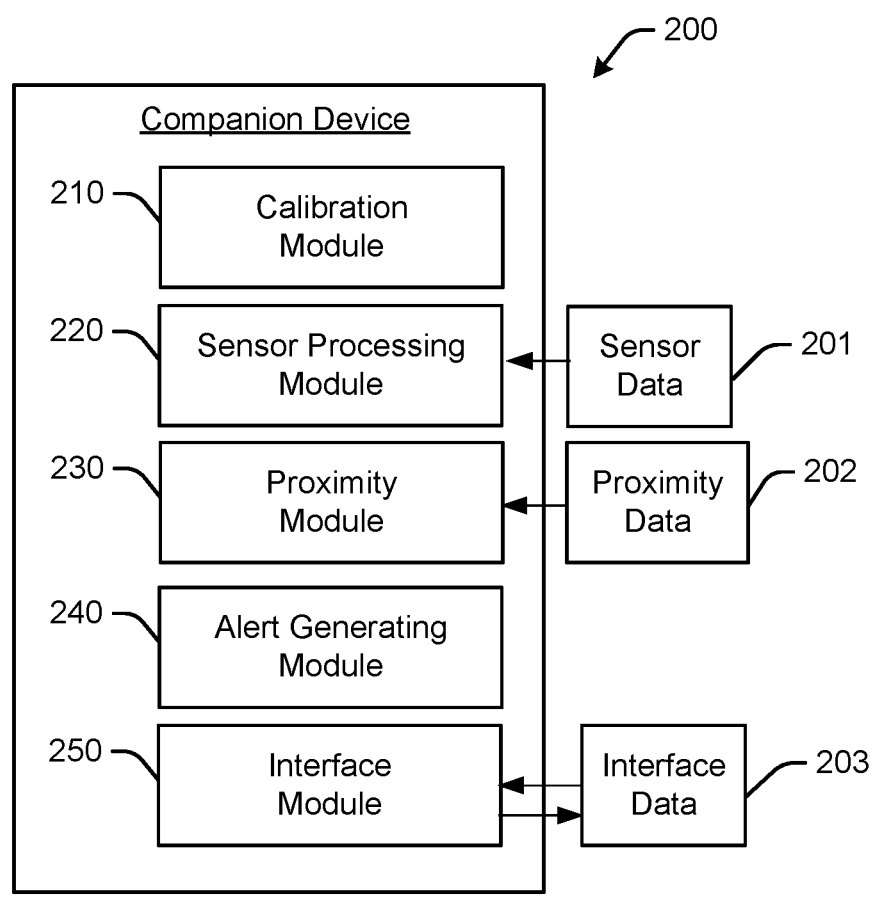
FIG. 2 shows an example architecture of machine readable instructions, which may be executed for implementing the example car seat safety device.

FIG. 2 shows an example architecture 200 of machine readable instructions, which may be executed for implementing the operations of the example car seat safety device. In an example, the program code of the companion device 140 discussed above with reference to FIG. 1 may be implemented in machine-readable instructions (such as but not limited to, software or firmware). The machine-readable instructions may be stored on a non-transient computer readable medium and are executable by one or more processors of the companion device 140 to perform the operations described herein. It is noted, however, that the components shown in FIGS. 1 and 2 are provided only for purposes of illustration of an example operating environment, and are not intended to limit implementation to any particular system configuration.

In an example, the program code executes the function of the architecture of machine readable instructions as self-contained modules. These modules can be integrated within a self-standing tool, or may be implemented as agents that run on top of an existing program code. In an example, the architecture of machine readable instructions may include a calibration module 210. The calibration module 210 may be executed to calibrate the car seat safety device 100. Example calibrations may include calibrating the sensors, setting predetermined parameters (e.g., weights, tensions, etc., as discussed above with reference to FIG. 1), proximity determinations, etc.

In an example, the architecture of machine readable instructions may include a sensor processing module 220. The sensor processing module 220 may receive sensor data 201 (e.g., from one or more of the sensors 120 described above with reference to FIG. 1), and process the data (e.g., for weight determinations).

In an example, the architecture of machine readable instructions may include a proximity module 230. The proximity module 230 may receive proximity data 202 (e.g., from the companion device 140 described above with reference to FIG. 1), and process the proximity data (e.g., for proximity determinations).

In an example, the architecture of machine readable instructions may include an alert generating module 240. The alert generating module 240 may generate alerts for a safety condition. Example safety conditions may include, but are not limited to the car seat 1 not being properly installed in the vehicle, a child not being strapped into the child car seat 1, a child being left in the child car seat unattended, the temperature in the vehicle reaching an unsafe level, etc.

In an example, the architecture of machine readable instructions may include an interface module 250. The interface module 250 may generate output (interface data 203) for the user, e.g., in the form of alerts and/or other data for the end-user. The interface module 250 may also receive user input (interface data 203), such as, but limited to, user selections, calibration information, device settings, acknowledgements, etc.

Figure 3:
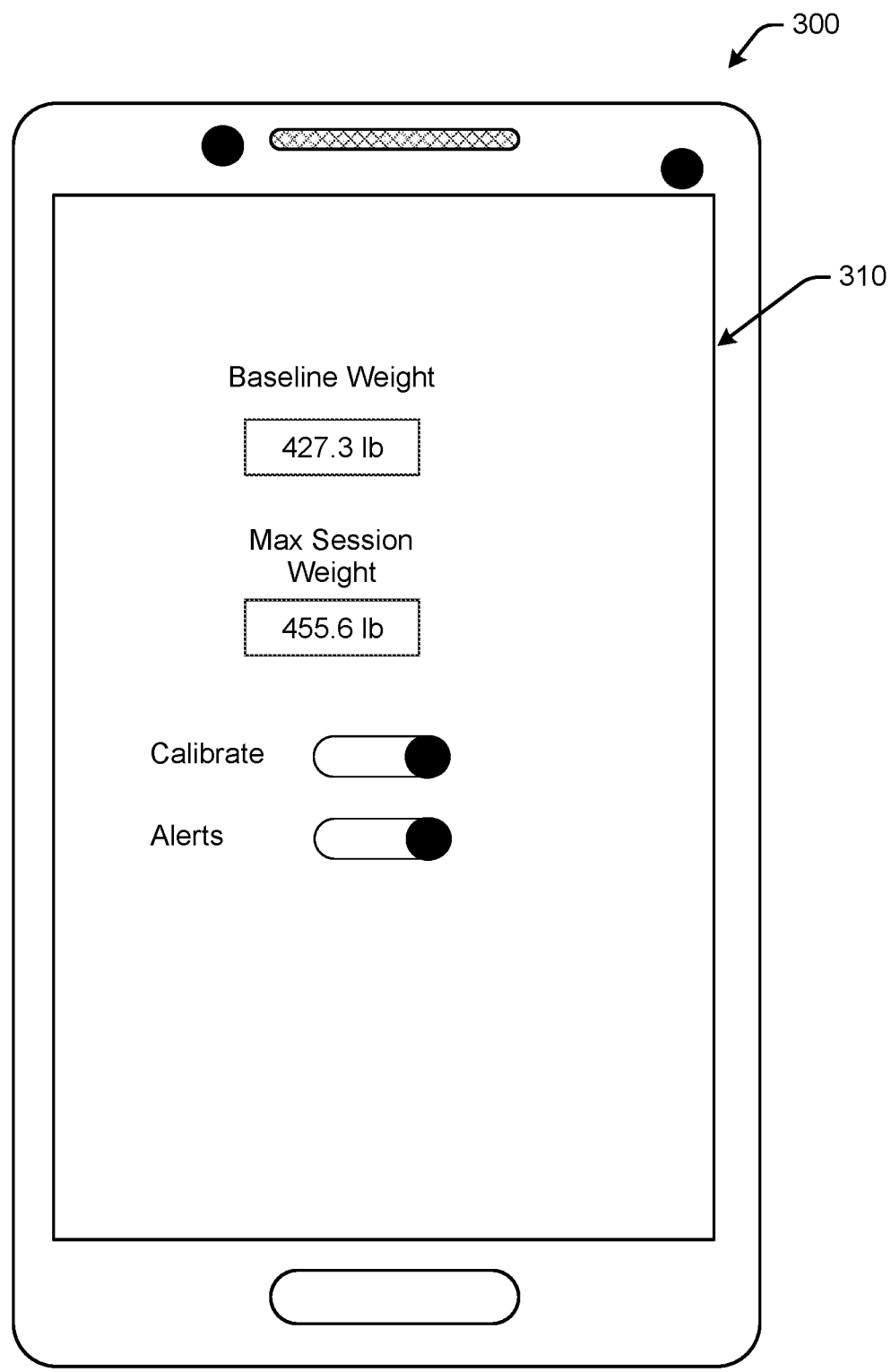
FIGS. 3 and 4 illustrate an example end-user interface which may be implemented by the example car seat safety device.
Figure 4:
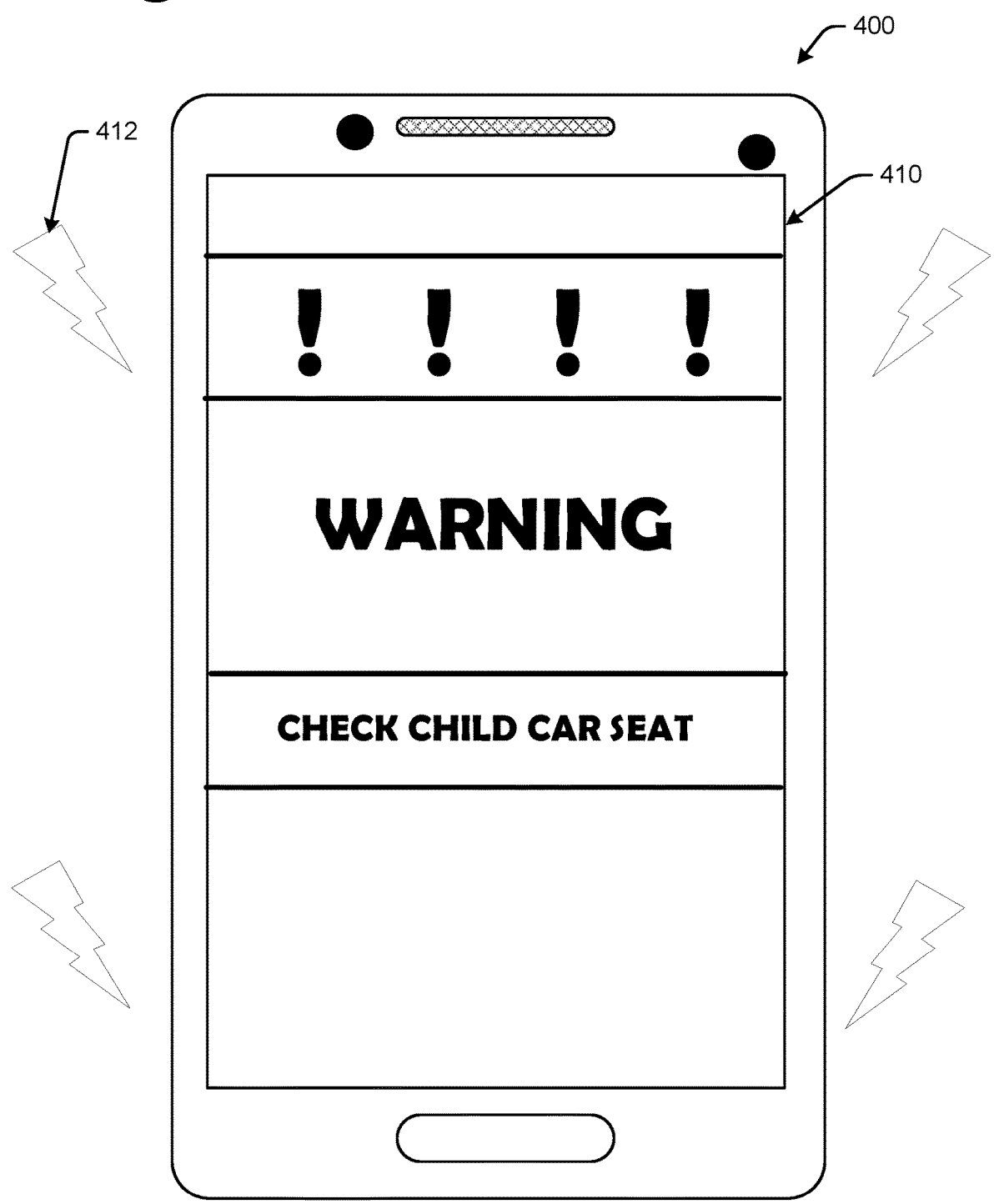

Program code to implement features of the system can be better understood with reference to FIGS. 3-5 and the following discussion of various example functions. However, the operations described herein are not limited to any specific implementation with any particular type of program code.

FIGS. 3 and 4 illustrate an example end-user interface which may be implemented by the example car seat safety device. The operations described herein may be implemented at least in part using the end-user interface (e.g., web-based or mobile device interface). In an example, the end-user is able to make predetermined selections, and the operations shown and described herein are implemented on a computing device to present results to a user. The user can then make further selections. Output may also be generated for the user via the interface. It is noted that the end-user interface may include graphics and/or other visual output, audible output, tactile feedback (e.g., vibrations), or any other type of output that can be generated via the end-user interface.

In FIG. 3, the user's mobile phone device 300 is configured via program code to generate an end-user interface 310. The end-user interface may display information (e.g., baseline weight and a maximum session weight), along with options to calibrate the car seat safety device 100 and/or turn on or set alerts.

In FIG. 4, the user's mobile phone device 400 is shown as the end-user interface 410 generates an alert. The alert includes displaying a warning message for the user, which may also include tactile feedback (illustrated by reference 412), and/or audible output (e.g., generated via the device speaker).

Before continuing, it should be noted that the examples described above are provided for purposes of illustration, and are not intended to be limiting. Other end-user interfaces and/or configurations thereof may be utilized to carry out the operations described herein.

FIG. 5 is a flowchart illustrating example operations which may be implemented by the example car seat safety device. Operations 500 may be embodied at least in part as logic instructions stored on one or more computer-readable medium. When executed on a processor, the logic instructions cause a general purpose computing device to be programmed as a special-purpose machine that implements the described operations. In an example, the components and connections depicted in the figures may be used. It is also noted that various of the operations described herein may be automated or partially automated.

Operation 510 includes calibrating the car seat safety device 100. Calibrating may be for weight measurements (with and without a child), tension on the child car seat 1, proximity, and any other data that needs to be calibrated for making determinations concerning the safety condition of the child car seat 1.

Operation 520 includes receiving sensor and/or proximity data. Sensor data may be received from one or more of the sensor(s) 120. Proximity data may be received from a sensor, based on a communication connection (e.g., as described above), a GPS signal, or any other source.

Operation 530 includes determining one or more safety conditions based on the sensor and/or proximity data.

Operation 540 includes generating a warning and/or other alert based on the safety condition being triggered.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A car seat safety device, comprising:
   at least one sensor for placement on or near a vehicle seat for monitoring a safety condition of a child car seat;
   a first wireless communications module communicatively coupled with output from the at least one sensor; and
   a second wireless communications module interacting with the first wireless communications module, the second wireless communications module communicatively coupled with a companion device to output an alert corresponding to the safety condition of the child car seat based on output of the at least one sensor; and
   wherein the at least one sensor is a weight sensor, the weight sensor measures a baseline weight indicating that the car seat is installed properly on the vehicle seat and the baseline weight is predetermined based on a calibrated weight of the child car seat and a tension force of the car seat against the vehicle seat indicating proper installation of the child car seat.

2. The car seat safety device of claim 1, wherein the companion device is a mobile device application executing on a mobile device.

3. The car seat safety device of claim 2, wherein the companion device automatically connects with the first wireless communications module when the mobile device is within a predetermined proximity of the vehicle seat.

4. The car seat safety device of claim 3, wherein proximity is determined by a Global Position System (GPS) of the companion device.

5. The car seat safety device of claim 3, wherein proximity is determined by a lost connection with the companion device.

6. The car seat safety device of claim 5, wherein the companion device remains connected with the first wireless communications module until the mobile device leaves the predetermined proximity.

7. The car seat safety device of claim 6, wherein the companion device automatically disconnects from the first wireless communications module when mobile device leaves the predetermined proximity of the vehicle seat.

8. The car seat safety device of claim 1, wherein the companion app registers a new weight above the baseline weight indicating that a child is in the child car seat.

9. The car seat safety device of claim 8, wherein a combination of registering the new weight and losing connectivity with the companion device activates an alarm that the child has been left unattended in the vehicle.

10. The car seat safety device of claim 8, wherein a combination of registering the new weight and the companion device leaving a proximity perimeter activates an alarm that the child has been left unattended in the vehicle.

11. The car seat safety device of claim 1 further comprising a platform for mounting the at least one sensor adjacent or under the child car seat.

12. The car seat safety device of claim 11, wherein the platform is larger than a base of the child car seat.

13. The car seat safety device of claim 1, further comprising at least one additional sensor for providing information regarding the child car seat to the companion app.

14. The car seat safety device of claim 13, wherein the at least one additional sensor is a motion sensor to detect vehicle motion, wherein an alarm is activated that the child has been left unattended in the vehicle only when no vehicle motion is detected.

15. The car seat safety device of claim 13, wherein the at least one additional sensor is a temperature sensor, wherein an alarm is activated that the child has been left unattended in the vehicle only when a temperature measured by the temperature sensor is outside of a range of threshold temperatures.

16. The car seat safety device of claim 1, further comprising generating a reminder on the mobile device for the user to check that the child is buckled into the child car seat.

17. The car seat safety device of claim 1, further comprising an interlock sensor to detect when a child is buckled into the child car seat, wherein the state of the sensor in combination with a weight detected to indicate a child is in the child car seat can generate an alert that the child is not buckled.

* * * * *